United States Patent
Miller et al.

(10) Patent No.: US 10,632,977 B2
(45) Date of Patent: Apr. 28, 2020

(54) VEHICULAR POST-IMPACT FORWARD MOVEMENT MITIGATION

(71) Applicant: Ford Global Technologies, LLC, Dearborn, MI (US)

(72) Inventors: Alex Maurice Miller, Canton, MI (US); Stephen William Rouhana, Plymouth, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 635 days.

(21) Appl. No.: 14/505,728

(22) Filed: Oct. 3, 2014

(65) Prior Publication Data

US 2016/0096514 A1 Apr. 7, 2016

(51) Int. Cl.
| | | |
|---|---|---|
| *B60T 7/22* | (2006.01) | |
| *B60W 30/08* | (2012.01) | |
| *B60W 30/09* | (2012.01) | |
| *B60T 7/04* | (2006.01) | |

(52) U.S. Cl.
CPC ............... *B60T 7/22* (2013.01); *B60T 7/042* (2013.01); *B60W 30/08* (2013.01); *B60W 30/09* (2013.01); *B60T 2201/024* (2013.01)

(58) Field of Classification Search
None
See application file for complete search history.

(56) References Cited

U.S. PATENT DOCUMENTS

| | | | |
|---|---|---|---|
| 6,267,194 B1 | 7/2001 | Bullinger et al. | |
| 6,364,433 B1 | 4/2002 | Sterner | |
| 7,027,920 B2 * | 4/2006 | Madau | B60K 31/0008 180/167 |
| 2003/0090150 A1 | 5/2003 | Woo | |
| 2005/0071071 A1 | 3/2005 | Nagata | |
| 2008/0060613 A1 * | 3/2008 | Bauerle | F02D 11/105 123/399 |
| 2010/0049398 A1 * | 2/2010 | Bryant | B60R 21/0132 701/31.4 |
| 2010/0228445 A1 * | 9/2010 | Kondoh | B60R 21/0132 701/45 |
| 2011/0066342 A1 * | 3/2011 | Ozaki | B60T 7/042 701/70 |
| 2012/0101701 A1 * | 4/2012 | Moshchuk | B60W 10/184 701/70 |
| 2014/0039774 A1 | 2/2014 | Kodama et al. | |
| 2015/0291031 A1 * | 10/2015 | Morimoto | B60W 50/12 701/70 |

FOREIGN PATENT DOCUMENTS

| | | |
|---|---|---|
| CN | 101144434 A | 3/2008 |
| JP | 2008149933 A | 7/2008 |

OTHER PUBLICATIONS

English Translation of Chinese Office Action dated Oct. 31, 2018 re Appl. No. 201510608490.8.

* cited by examiner

*Primary Examiner* — Nicholas K Wiltey
(74) *Attorney, Agent, or Firm* — Frank A. MacKenzie; Bejin Bieneman PLC

(57) ABSTRACT

A vehicle impact is determined to be likely to occur. Determinations are made that a vehicle speed is below a first predetermined threshold, that a vehicle pedal condition is met, and that a vehicle acceleration is below a second predetermined threshold. At least one instruction is then provided that includes at least one of an instruction to override an acceleration request and an instruction to suppress a throttle.

20 Claims, 2 Drawing Sheets

VEHICULAR POST-IMPACT FORWARD MOVEMENT MITIGATION

BACKGROUND

A common vehicle accident scenario is for a first vehicle at the end of a traffic jam, or at the end of a queue waiting at an intersection, to be hit from behind and pushed into a second vehicle in front of the first vehicle. For certain events, even low-g impacts, a driver can be startled and/or or physically move such that the driver's foot slips off the brake pedal and hits an accelerator pedal. This problem can occur in any vehicle, but may be particularly likely in cars having a small distance between pedals. Additionally or alternatively, a driver may have his or her foot off the brake pedal, hovering above the accelerator pedal such that an impact force causes a driver's foot to push the accelerator pedal down.

The effect of such accident behavior, even in low-g impacts, can have significant consequences. For example, a change in state when an accelerator pedal is inadvertently depressed after an impact can cause a release from a zero-movement or low-movement state to a higher-movement state, which can then cause a vehicle that was initially impacted to in turn impact a next vehicle in a queue, or even worse, travel into an intersection when the impacted vehicle does not have the right-away. At even very low speed impacts, vehicles can endure thousands of dollars' worth of damage, or in the latter case vehicle occupants can sustain serious injuries.

Existing systems address only high-g impacts. For example, when a high-g impact is detected, e.g., an impact at an acceleration of 3-4 g (hereinafter described as a g-force level of 3-4), a fuel cut-off system can cut the fuel flow to the engine to prevent forward movement of a vehicle. Such systems may assume, for example, constant acceleration, where vehicle acceleration=(vehicle velocity at time n−vehicle velocity at time zero)/time. At an impact having lower force, e.g., an acceleration of 1-3 g, (i.e., a g-force level of 1-3), where engine fuel is not cut off, and when a driver inadvertently depresses a brake or accelerator pedal, systems are lacking to prevent undesired forward movement of a vehicle. (A "g-force" is generally defined as 9.81 m/s$^2$ or 32.2 ft/sec$^2$.)

A g-force in the range of 1-3 is nonetheless sufficient to startle a driver and/or cause a driver to lose footing on vehicle pedals. Accelerations or g-forces in this range are generally low enough energy such that typical injuries are not serious. However, additional vehicle movement can increase the likelihood and severity of rear impact-induced injuries, or other injuries if the vehicle is pushed into an intersection.

DRAWINGS

DETAILED DESCRIPTION

Introduction

Figure 1:
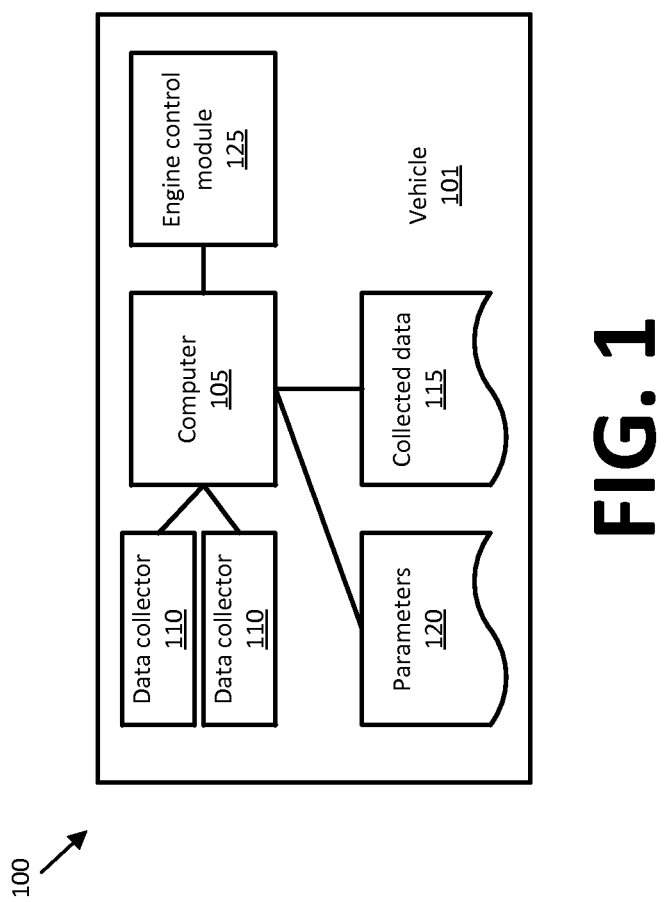
FIG. 1 is a block diagram of an exemplary system for mitigating post-impact forward movement of a vehicle.

FIG. 1 is a block diagram of an exemplary system 101 in a vehicle 101 for mitigating post-impact forward movement of the vehicle 101. A computer 105 in the vehicle 101 detects an impact of the vehicle 101 and then performs processing to address undesired and/or unsafe acceleration of the vehicle 101. For example, as described further below, the computer 105 generally monitors speed and acceleration forces of the vehicle 101 and, if an impact is detected, initiates actions, such as throttle and/or brake control depending on the measured speed and acceleration. The initiated actions advantageously provide for vehicle 101 occupant protection, e.g., preventing the vehicle 101 from suddenly accelerating even when the vehicle 101 is not traveling at a speed sufficient to activate a fuel cut-off mechanism.

Exemplary System Elements

A vehicle 101 computer 105 generally includes a processor and a memory, the memory including one or more forms of computer-readable media, and storing instructions executable by the processor for performing various operations, including as disclosed herein. The memory of the computer 105 further generally stores collected data 115. The computer 105 is configured for communications on a controller area network (CAN) bus or the like, and/or other wire or wireless protocols, e.g., Bluetooth, etc., i.e., the computer 105 can communicate via various mechanisms that may be provided in the vehicle 101. The computer 105 may also have a connection to an onboard diagnostics connector (OBD-II). Via the CAN bus, OBD-II, and/or other wired or wireless mechanisms, the computer 105 may transmit messages to various devices in a vehicle and/or receive messages from the various devices, e.g., controllers, actuators, sensors, etc., including one more user devices 150, data collectors 110. In addition, the computer 105 may be configured for communicating, e.g., with one or more remote servers 125, with the network 120, which, as described below, may include various wired and/or wireless networking technologies, e.g., cellular, Bluetooth, wired and/or wireless packet networks, etc.

Data collectors 110 may include a variety of devices, e.g., cameras, radar, lidar, ultrasonic sensors, accelerometers, etc. For example, various controllers in a vehicle may operate as data collectors 110 to provide data 115 via the CAN bus, e.g., data 115 relating to vehicle speed, acceleration, location, etc., in addition to environmental conditions such mentioned above. Further, sensors or the like, global positioning system (GPS) equipment, etc., could be included in a vehicle and configured as data collectors 110 to provide data directly to the computer 105, e.g., via a wired or wireless connection.

Collected data 115 may include a variety of data collected in the vehicle 101, including the examples listed above. Data 115 is generally collected using one or more data collectors 110, and may additionally include data calculated therefrom in the computer 105. In general, collected data 115 may include any data that may be gathered by a collection device 110 and/or computed from such data. Examples of collected data 115 include a vehicle speed, a vehicle accelerator pedal position, a vehicle brake pedal position, a road grade at a vehicle location, a detection that an impact is imminent (e.g., likely to occur within 250 milliseconds or less, or within some other value that may be determined according to a time parameter 120 as described below), an impact acceleration vector (i.e., a force and a direction of an impact), etc.

Parameters 120 are used in conjunction with collected data 115 by the computer 105 to determine actions to take in an impact scenario, e.g., as described below with respect to FIG. 2. In general, parameters 120 identify values that constrain or dictate, possibly in conjunction with other parameters 120 and/or data 115, action taken in an impact scenario. Parameters 120 can include the following, the letter in parentheses following each parameter indicating an identifier for the parameter used in the description below and in the descriptions in FIG. 2:

(A) vehicle speed parameter, e.g., in kilometers per hour;
(B) accelerator pedal position, e.g., an angular value or pedal travel value, e.g., a pedal travel value, sometimes referred to as a "count" may be assigned on a predetermined scale, e.g., from zero to one-hundred (in practice, counts may be assigned according to a different scale, but for ease of explanation and implementation, counts herein are referred to on a normalized scale of zero to one-hundred), where zero represents a position of the pedal in a completely undepressed position, and one-hundred represents a position of the pedal in its most depressed position, with values in between assigned to pedal positions, usually determined in equal increments of pedal travel, between the least depressed and most depressed positions;
(C) brake pedal position, e.g., an angular value (or pedal travel value);
(D) time, e.g., in milliseconds, within which a detected impact is to be determined to be imminent;
(E) lower bound acceleration or g-force parameter for impact acceleration vector;
(F) upper bound acceleration or g-force parameter for impact acceleration vector; and
(G) rear-impact injury acceleration threshold/g-force parameter for impact acceleration vector.

As described further below, the computer 105 may determine, based on a detected impact, to provide an instruction to an engine control module (ECM) 125 to suppress an acceleration request and/or to override control of a throttle. The ECM 125 is generally known for providing control of an engine in a vehicle, including throttle control. Further, the ECM 125 may communicate with the computer 105 via known mechanisms such as discussed above, and/or the computer 105 may be included in the ECM 125. That is, the ECM 125 may carry out operations attributed herein to the computer 105, which accordingly could be omitted as a separate hardware component.

Exemplary Process Flow

Figure 2:
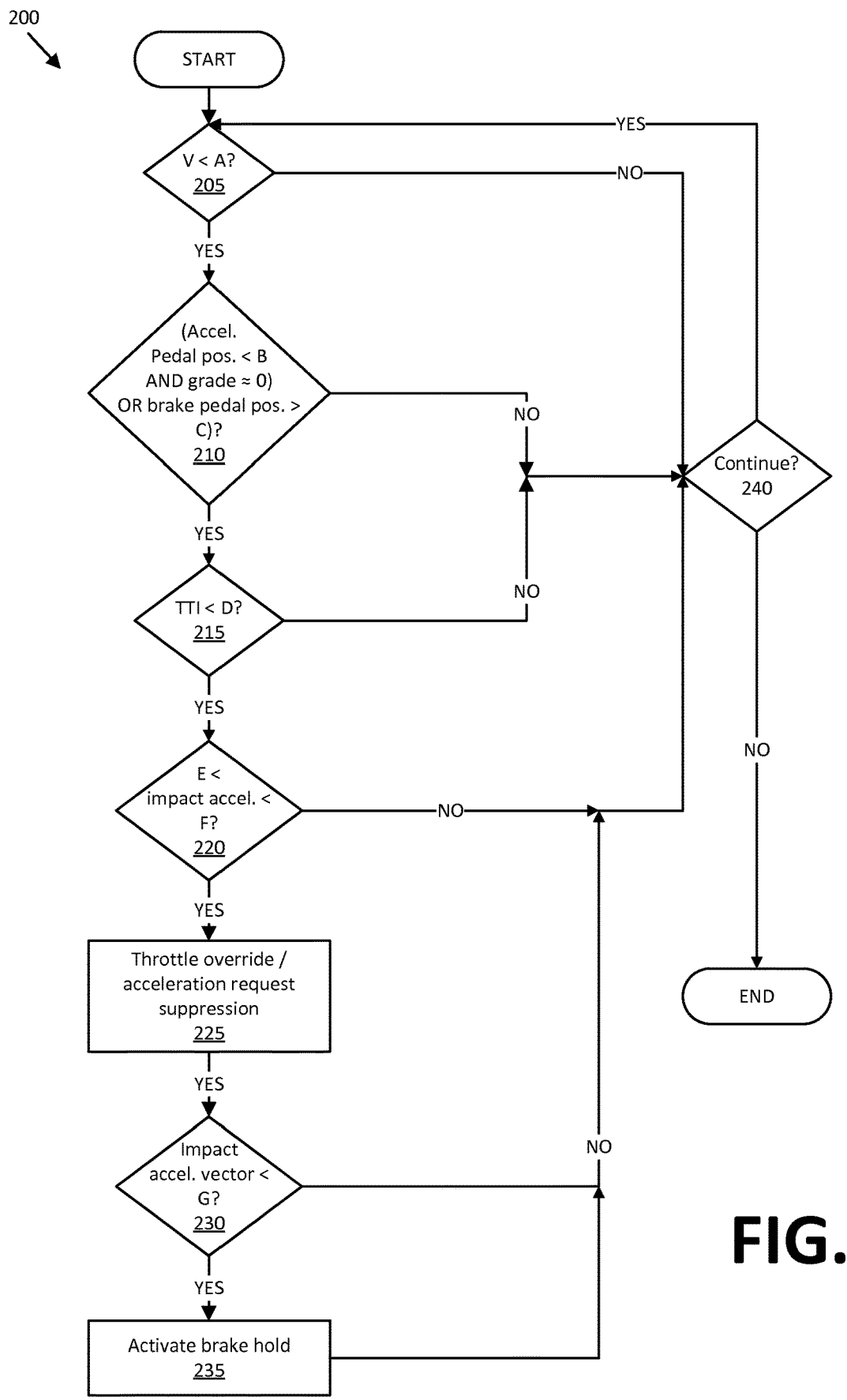
FIG. 2 is a diagram of an exemplary process for mitigating post-impact forward movement of a vehicle.

FIG. 2 is a diagram of an exemplary process 200 for mitigating post-impact forward movement of a vehicle. As mentioned above, the process 200 uses parameters 120 such as described above, e.g., for comparison to various items of collected data 115 as described below, such as vehicle speed, pedal positions, impact acceleration vectors, etc.

The process 200 is initiated when a likely or impending impact, e.g., a rear-end impact, has been detected by the computer 105 in a vehicle 101. Collected data 115 may include regularly updated values in the computer 105 for speed, accelerator and/or brake pedal position(s), and road grade, etc., that may be used in a known manner for determining a likely and/or impending impact, as well as for steps described below. For example, a vehicle impact could be deemed to be likely to occur based on a predetermined confidence determined by a vehicle 101 collision detection system that a vehicle 101 impact could occur. Upon such detection, in a block 205, the computer 105 determines whether a current vehicle 101 speed is less than a value of a parameter 120 specifying a vehicle speed A. If not, then the process 200 proceeds to a block 240. However, if the vehicle 101 speed is less than specified by the speed A, then the process 200 proceeds to a block 210. Note that the speed A is generally a relative low value, e.g., ten kilometers per hours or less, because if a vehicle 101 is moving at a higher rate of speed it is unlikely to be beneficial, to suppress throttle and/or braking control.

In the block 210, the computer 105 determines whether a condition relating to a vehicle pedal position is met. For example, the computer 105 may determine whether a vehicle 101 accelerator pedal position is less than a parameter 120 pedal position B. In conjunction with a determination relating to the accelerator pedal position, the computer 105 generally also determines whether a road grade indicated by collected data 115 is zero or substantially, e.g., within one or two degrees of, zero. (Note that road grade can be characterized as positive or negative depending on whether a road inclines downwardly or upwardly with respect to a forward direction of the vehicle 101; therefore, in one implementation, the step 210 can include evaluating the absolute value of the road grade, i.e., to account for situations where the road grade value is negative.) The pedal position B is generally relatively small, e.g., a count that is generally calibrated for a pedal sensitivity of a pedal in a particular vehicle 101, e.g., a particular type, e.g., make, model, trim level, etc., of a vehicle 101 according to a pedal position likely to inadvertent and/or excessive following an impact, because in a secondary impact situation any significant depression of an accelerator pedal instructing rapid acceleration of the vehicle 101 could be dangerous and/or undesirable. The computer 105 may also determine whether a brake pedal position is greater than a brake pedal position C, e.g., a count indicated by a parameter 120. If one or both of the foregoing determinations evaluates to true, the process 200 proceeds to a block 215. Otherwise, the process 200 proceeds to the block 240.

In the block 215, the computer 105 determines whether a time to impact is less than a time D indicated by a parameter 120. A potential impact and/or time to impact may be determined using known collision-detecting mechanisms and/or data collectors 110, e.g., a rear-facing camera providing an image that can be processed, ultrasonic sensors, etc. If a time to impact is less than the time D, e.g., less than 250 milliseconds (ms) or some other value as appropriate depending on a type of collected data 115 being used to determine the likely impact and/or other factors, then the process 200 proceeds to a block 220. Otherwise, a block 240 is executed next. As just stated, the time to impact D parameter 120 can be configured dependent on various factors, e.g., a degree of confidence desired that an impact will occur (i.e., lower values may indicate a higher confidence), as well as a type or types of data 115 used to determine the impact, e.g., ultrasonic systems generally have a system latency of anywhere from 300 to 600 ms, cameras could have a latency of 200 ms, whereas radars could be as fast as a latency of 40 ms).

The block 220 generally follows the block 215, and also generally follows an impact, e.g., as determined likely as described above. However, note that it is possible that no impact occurs. For example, where the time-to-impact D parameter 120 is set to a relatively high value, e.g., 1000 ms, there will likely be a lower degree of confidence that an impact will occur and in fact there may be cases where the process 200 is executed but no impact occurs. Once the impact is detected, the computer 105 generally determines from collected data 115, e.g., using data from the accelerometer data collectors 110 or the like, a g-force associated with an impact acceleration vector. If the impact acceleration vector g-force is between g-force values E and F specified by parameters 120, e.g., in a range of 1-3, then a block 225 is executed next. Otherwise, the process 200 proceeds to the block 240. Note that the value E parameter 120 is set based on how a vehicle 101 performs based on acceleration caused by the vehicle 101 engine only, i.e., an acceleration E should not be achievable without an external force, e.g., a collision with some body, being exerted on the vehicle 101.

In the block 225, the computer 105 sends an instruction to the ECM 125 to override a throttle instruction and/or to suppress an acceleration request as appropriate. For example, if an accelerator pedal position in the vehicle 101 indicates that a throttle request has been made by the driver, the computer 105 may provide an instruction to the ECM 125 to suppress the requested acceleration and/or to reduce a vehicle 101 throttle if the conditions of block 210 have been met. Thus, the vehicle 101 will advantageously be prevented from transitioning from a low-movement state, e.g., at a g-force of 1-3, to a higher-movement state.

The process 200 may proceed to the block 240 following the block 225, although as shown in FIG. 2, the block 230 is optionally executed following the block 225 for the purpose of preventing or reducing rear impact-induced injury. In the block 230, the computer 105 determines whether a vehicle 101 impact acceleration vector includes a g-force less than a value G, generally less than the value F, e.g., less than a g-force of 3, specified by parameter 120 as described above. If not, the process 200 returns to the block 240. If the determination of the block 230 is yes, then a block 235 is executed. Note that the value G parameter 120 must be set carefully; if G is set too high, holding the vehicle 101 brake after an impact may actually induce rear impact-induced injury to an even greater extent than just the body force disturbance of the impact.

In the block 235, the computer 105 sends an instruction to the vehicle 101 brake controller or the like preventing activation of vehicle 101 brakes. Advantageously, therefore, injury may be reduced or even prevented. Following the block 235, the process 200 proceeds to the block 240.

In the block 240, the computer 105 determines whether the process 200 should continue. For example, the vehicle 101 may be powered off, user input could be received to stop the process 200, the computer 105 could lose connectivity with the network 120 and/or other mechanisms providing data 117 from remote sources, etc. In any event, if the process 200 should continue, then the block 205 is executed following the block 240. Otherwise, the process 200 ends following the block 240.

CONCLUSION

Computing devices such as those discussed herein generally each include instructions executable by one or more computing devices such as those identified above, and for carrying out blocks or steps of processes described above. For example, process blocks discussed above may be embodied as computer-executable instructions.

Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in a computing device is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

In the drawings, the same reference numbers indicate the same elements. Further, some or all of these elements could be changed. With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The invention claimed is:

1. A system, comprising a computer for a first vehicle, the computer comprising a processor and a memory, wherein the computer is programmed to:

upon determining that all of the following conditions are met: (a) that an impact of the first vehicle with a second vehicle is likely to occur based on sensor data;

(b) that a speed of the first vehicle is below a first predetermined threshold and that a pedal condition of the first vehicle is met; and (c) that an acceleration of the first vehicle is between predetermined upper and lower bounds, the lower bound being greater than zero;

then provide at least one instruction in the first vehicle that includes at least one of an instruction to override an acceleration request and an instruction to suppress a throttle.

2. The system of claim 1, wherein the computer is further programmed to determine, after providing the at least one instruction, whether the acceleration of the first vehicle is below a third predetermined threshold.

3. The system of claim 2, wherein the computer is further programmed to provide an instruction to activate a brake hold upon determining that the acceleration of the first vehicle is below the third predetermined threshold.

4. The system of claim 1, wherein the pedal condition is one of a position of a brake pedal and a position of an accelerator pedal.

5. The system of claim 1, wherein the computer is further programmed to determine a road grade, and provide the at least one instruction only if the road grade is below a predetermined threshold.

6. The system of claim 1, wherein the computer is further programmed to determine, after the at least one instruction is provided, that the acceleration of the first vehicle is above a third predetermined threshold as a condition for providing at least one additional instruction, wherein the additional instruction is related to braking of the first vehicle.

7. The system of claim 1, wherein the determination that the impact of the first vehicle with the second vehicle is likely to occur is made according to a predetermined time that is in a range of about 40 to 1000 milliseconds.

8. The system of claim 1, wherein the upper bounds is a g-force level of three.

9. The system of claim 1, wherein the impact of the first vehicle with the second vehicle that is determined likely to occur is a second impact subsequent to a first impact.

10. The system of claim 1, wherein the lower bounds is greater than an acceleration of the first vehicle caused solely by an engine of the first vehicle.

11. A method implemented in a first vehicle, the method comprising:
    upon determining that all of the following conditions are met: (a) that an impact of the first vehicle with a second vehicle is likely to occur based on sensor data;
    (b) that a speed of the first vehicle is below a first predetermined threshold and that a pedal condition of the first vehicle is met; and
    (c) that an acceleration of the first vehicle is between predetermined upper and lower bounds, the lower bound being greater than zero;
    then providing at least one instruction in the first vehicle that includes at least one of an instruction to override an acceleration request and an instruction to suppress a throttle.

12. The method of claim 11, further comprising determining, after providing the at least one instruction, whether the acceleration of the first vehicle is below a third predetermined threshold.

13. The method of claim 12, further comprising providing an instruction to activate a brake hold upon determining that the acceleration of the first vehicle is below the third predetermined threshold.

14. The method of claim 11, wherein the pedal condition is one of a position of a brake pedal and a position of an accelerator pedal.

15. The method of claim 11, further comprising determining a road grade, and providing the at least one instruction only if the road grade is below a predetermined threshold.

16. The method of claim 11, further comprising determining, after the at least one instruction is provided, that the acceleration of the first vehicle is above a third predetermined threshold as a condition for providing at least one additional instruction, wherein the additional instruction is related to braking of the first vehicle.

17. The method of claim 11, wherein the determination that the impact of the first vehicle with the second vehicle is likely to occur is made according to a predetermined time that is in a range of about 40 to 1000 milliseconds.

18. The method of claim 11, wherein the upper bounds is a g-force level of three.

19. The method of claim 11, wherein the impact of the first vehicle with the second vehicle that is determined likely to occur is a second impact subsequent to a first impact.

20. The method of claim 11, wherein the lower bounds is greater than an acceleration of the first vehicle caused solely by an engine of the first vehicle.

* * * * *